US012659205B2

(12) United States Patent
Cevikgibi et al.

(10) Patent No.: US 12,659,205 B2
(45) Date of Patent: Jun. 16, 2026

(54) INTER-NUMEROLOGY INTERFERENCE BLOCKER IN MULTI-NUMEROLOGY SYSTEMS

(71) Applicant: TOBB EKONOMI VE TEKNOLOJI UNIVERSITESI, Ankara (TR)

(72) Inventors: Bugra Alp Cevikgibi, Ankara (TR); Tolga Girici, Ankara (TR); Ali Murat Demirtas, Ankara (TR)

( * ) Notice: Subject to any disclaimer, the term of this patent is extended or adjusted under 35 U.S.C. 154(b) by 42 days.

(21) Appl. No.: 18/724,762

(22) PCT Filed: Dec. 20, 2022

(86) PCT No.: PCT/TR2022/051538
§ 371 (c)(1),
(2) Date: Jun. 27, 2024

(87) PCT Pub. No.: WO2023/129035
PCT Pub. Date: Jul. 6, 2023

(65) Prior Publication Data
US 2025/0080385 A1 Mar. 6, 2025

(30) Foreign Application Priority Data
Dec. 30, 2021 (TR) ............................... 2021/021839

(51) Int. Cl.
*H04L 27/26* (2006.01)
*H04L 5/00* (2006.01)
(52) U.S. Cl.
CPC ........ *H04L 27/26025* (2021.01); *H04L 5/001* (2013.01)

(58) Field of Classification Search
CPC .......................... H04L 27/26025; H04L 5/001
See application file for complete search history.

(56) References Cited

U.S. PATENT DOCUMENTS

| | | | | |
|---|---|---|---|---|
| 2018/0091267 | A1* | 3/2018 | Kim ........................ | H04L 5/001 |
| 2018/0198659 | A1* | 7/2018 | Ko ....................... | H04L 27/2602 |
| 2020/0383129 | A1* | 12/2020 | Ko ........................ | H04L 5/0023 |
| 2023/0291623 | A1* | 9/2023 | Memisoglu ......... | H04L 27/2614 |

FOREIGN PATENT DOCUMENTS

| | | |
|---|---|---|
| WO | 2018170867 A1 | 9/2018 |
| WO | 2019086114 A1 | 5/2019 |
| WO | 2021022391 A1 | 2/2021 |

OTHER PUBLICATIONS

International Search Report for corresponding PCT/TR2022/051538 dated Jul. 20, 2023.
Written Opinion of the International Searching Authority for corresponding PCT/TR2022/051538 dated Jul. 20, 2023.
Kihero et al., "Inter-Numerology Interference for Beyond 5G," IEEE Access, vol. 7, pp. 146512-146523, Oct. 7, 2019.

* cited by examiner

*Primary Examiner* — Janice N Tieu
(74) *Attorney, Agent, or Firm* — EGBERT, MCDANIEL & SWARTZ, PLLC

(57) ABSTRACT

This invention relates to a method for removing inter-numerology interference in transmitters and base stations in down-link situations in 5G and beyond multi-numerology systems, and a pre-equalizer (5) adapted to operate this method.

12 Claims, 2 Drawing Sheets

INTER-NUMEROLOGY INTERFERENCE BLOCKER IN MULTI-NUMEROLOGY SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC, AS TEXT FILE OR AN XML FILE VIA THE PATENT ELECTRONIC SYSTEM

Not applicable.

STATEMENT REGARDING PRIOR DISCLOSURE BY THE INVENTOR OR A JOINT INVENTOR

Not applicable.

BACKGROUND OF THE INVENTION

1. Field of the Invention

This invention relates to a method for removing inter-numerology interference in transmitters and base stations in down-link situations in 5G and beyond multi-numerology systems, and a pre-equalizer adapted to operate this method.

2. Description of Related Art Including Information Disclosed Under 37 CFR 1.97 and 37 CFR 1.98

Frequency bands are used to carry signals in communication technologies. One of the new technology signal types used to carry data in the frequency band in GSM and wireless communication technologies is OFDM signal. OFDM Orthogonal Frequency Division Multiplexing signal is used in GSM communications, wireless Wi-Fi communications and next generation 5G communications.

In communication systems such as wireless 4G and LTE (Long Term Evolution), OFDM signals with 15 kHz (kilohertz) subcarrier spacing are used. However, in 5G and beyond systems, it is aimed to use multiples of 15 kHz subcarriers (30 kHz, 60 kHz, 120 kHz and 240 kHz). In this way, it is aimed to support different services. OFDM signals with different subcarrier spacing are called numerologies. However, the use of OFDM signals with different subcarrier spacings together in the common frequency band causes these OFDM signals to interfere with each other. This interference has been accepted as inter-numerology interference (INI) in the literature.

The said OFDM signals make interference outside of their bands. When another OFDM signal is placed next to the OFDM signal, each OFDM signal makes an interference out of its band and jams the other OFDM signal. Signals with different frequency band width are called different numerology, and the effect of numerologies with different frequency band width is called inter-numerology interference (INI) as stated above. Side lobes (extensions) of the signal in the frequency domain do not affect each other in signal transmission, however when different numerologies are used side by side, the extensions of the signals affect each other and inter-numerology interference occurs.

Inter-numerology interference is an important technical problem for currently known 5G and beyond communication. In order to avoid the negative effects of inter-numerology interference, protective bands are placed between different numerology signals in frequency size. While carrying the OFDM signals, when another signal is wanted to be placed next to the OFDM signal, it is necessary to place protective bands between the second OFDM signal and the first OFDM signal due to the interference of the OFDM signal, and these protective bands are left blank for communication. The larger the area covered by the said protective bands, the less the interference of different OFDM signals to each other. Leaving a blank between OFDM signals and the use of protective bands cause inefficient use of the carrying band. GSM companies pay a fee for the signal carrying bands. When a space is left between the OFDM signals, the blank portion of the band cannot be used, and a portion of the band is wasted. Especially considering that different OFDM signals will be used together in the common frequency band in 5G and beyond technologies, it can be stated that the said solution generates an inefficient frequency spectrum.

Another application used to eliminate the negative effects of inter-numerology interference is filtering. In applications where filters are used, the extensions (side lobes) of the signal are filtered to prevent interference, so the extensions of the signal are tried to be minimized. Inter-numerology interference (OFDM signals with different subcarrier spacings) is aimed to be solved by iterative interference removal methods in receivers or by using various filters in transmitters. The application of filters causes the receivers and transmitters of the signal carrying systems to be more complex, and very large filters must be used. Another disadvantage of filtering is that it causes jamming of the original signal. With the filter, it is desired to filter the extensions of the original signal, and during this filtering, the original signal may be distorted, because it is very difficult and requires a lot of complexity to generate ideal filters that work in real time.

The applications used to remove the inter-numerology interference generally reduce the interference, however the said applications cannot completely eliminate the interference. Since the interference is not completely eliminated, the amount of error is only reduced, and the amount of error cannot be completely eliminated. The applications in the prior art and described above cause inefficient use of the frequency spectrum, more complex structures of the receivers and transmitters, more power consumption, and a decrease in communication quality.

With the present application, interference between different numerology signals is completely eliminated in transmitters. With the present invention, the interference caused by the signals to each other is completely eliminated in the transmitters, without putting any protective band between the signals. With the present application, interference between OFDM signals in the transmission band is eliminated and OFDM signals can be placed side by side in the frequency band without leaving any blanks. In this way, there is no need to use filters and protective band.

OBJECTS OF THE INVENTION

Brief Summary of the Invention

The object of the present invention is to remove the interference between numerologies with different subcarriers when they are used in the common frequency band, without the need to place any protective band between them.

Another object of the present invention is to remove the inter-numerology interference in the transmitter without creating a complex structure in the transmitters.

Another object of the present invention is to remove the inter-numerology interference in the transmitter without delay or extra power loss in the communication system.

Another object of the present invention is to remove the inter-numerology interference by using the pre-equalizer.

The inter-numerology interference blocking method realized to achieve the object of the present invention is shown in the attached figures, in which;

Figure 1:
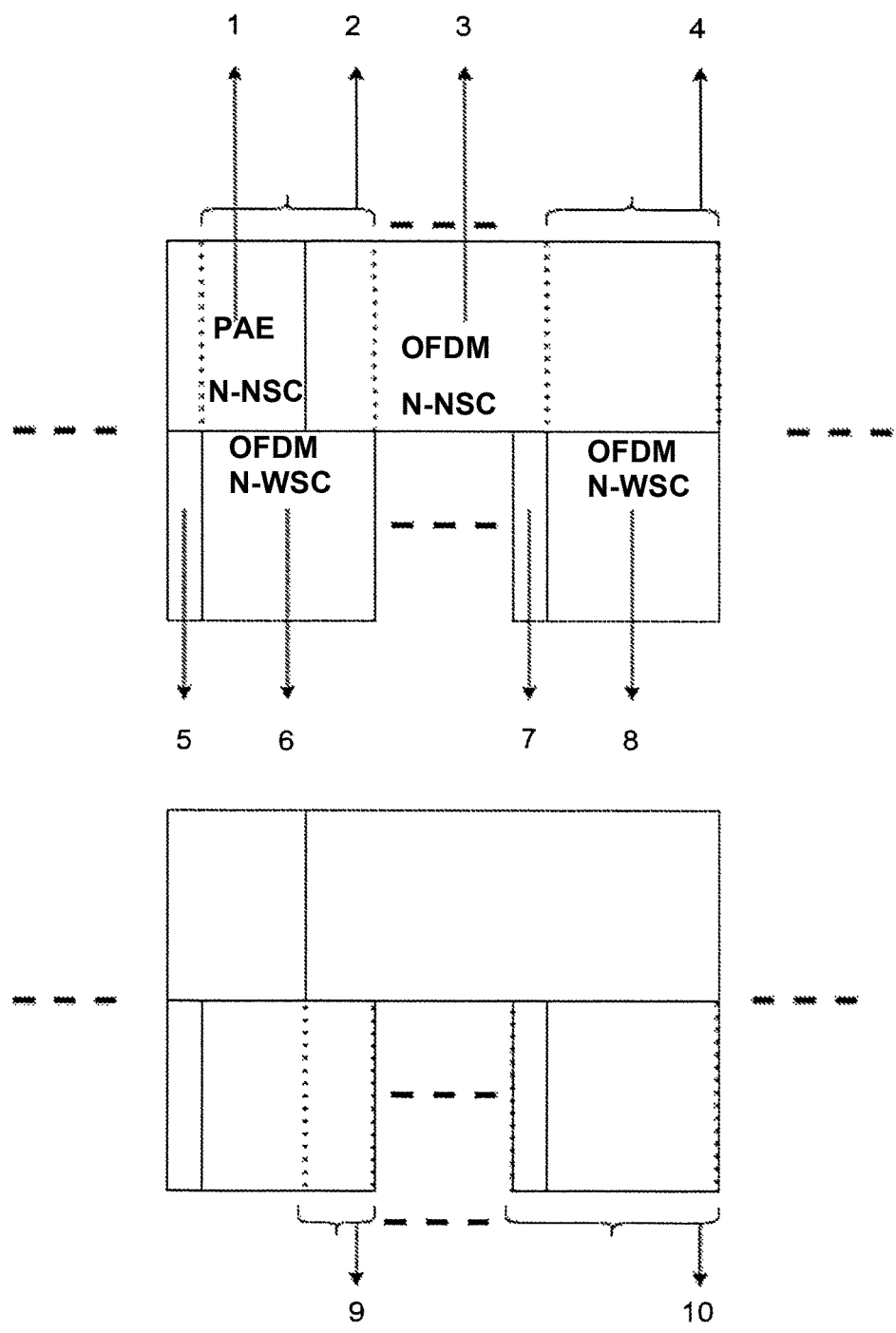
FIG. 1. is the schematic view of the interference made by Numerology-NSC to numerology-WSC.

The explanations of the numbers in FIG. 1 are given below.

1—Cyclic prefix of Numerology-NSC.

2—The region of numerology-NSC making interference to the first OFDM symbol (q=0) of the numerology-WSC in the time dimension

3—Usable OFDM region (useful FFT part) of Numerology-NSC.

4—The region of numerology-NSC making interference to the last OFDM symbol (q=Q−1) of the numerology-WSC in the time dimension.

5—Pre-equalizer (cyclic prefix of the first OFDM symbol (q=0) of Numerology-WSC).

6—The usable region (useful FFT part) of the first OFDM symbol (q=0) of Numerology-WSC.

7—Cyclic prefix of the last OFDM symbol (q=Q−1) of Numerology-WSC.

8—Usable region (useful FFT part) of the last OFDM symbol (q=Q−1) of Numerology-WSC.

9—The region of the first OFDM symbol of numerology-WSC interfering to numerology-NSC.

10—The region of the last OFDM symbol of numerology-WSC interfering to numerology-WSC.

Figure 2:
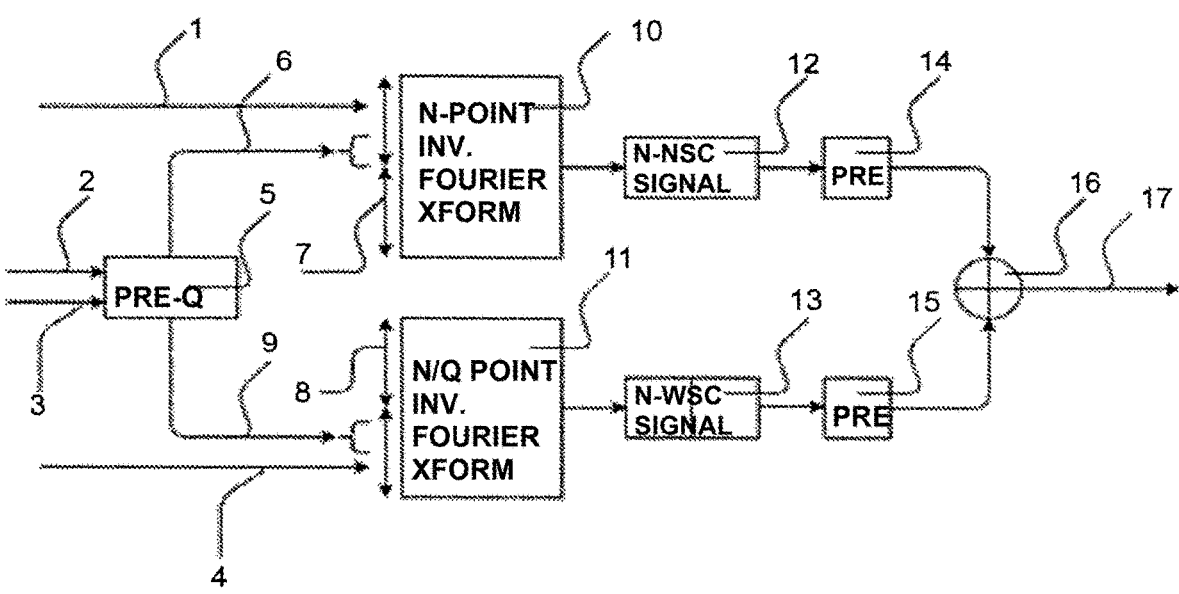

FIG. 2. is a schematic view showing how to remove inter-numerology interference.

The explanations of the numbers in FIG. 2 are given below.

1—Symbols of Numerology-NSC without inter-numerology interference pre-equalization.

2—Symbols of Numerology-NSC for which inter-numerology interference pre-equalization is desired.

3—Symbols of Numerology-WSC for which inter-numerology interference pre-equalization is desired.

4—Symbols of Numerology-WSC without inter-numerology interference pre-equalization.

5—Pre-equalizer (where inter-numerology interference pre-equalization matrix multiplication is done)

6—Symbols of Numerology-WSC, inter-numerology interference pre-equalization of which is made.

7—Region allocated (zero-padding) for Numerology-WSC in the vector in which N-length inverse discrete Fourier transform is desired.

8—Region allocated (zero-padding) for Numerology-NSC in the vector in which N/Q-length inverse discrete Fourier transform is desired.

9—Symbols of Numerology-WSC, inter-numerology interference pre-equalization of which is made.

10—N-point inverse discrete Fourier transform operation.

11—N/Q-point inverse discrete Fourier transform operation.

12—N-length numerology-NSC OFDM signal in time dimension.

13—N/Q-length numerology-WSC OFDM signal in time dimension.

14—Adding the cyclic prefix for numerology-NSC.

15—Adding the cyclic prefix for Numerology-WSC.

16—Collecting numerology-NSC and numerology-WSC in time dimension.

17—Generating multi-numerology OFDM signal with inter-numerology interference removed.

DETAILED DESCRIPTION OF THE INVENTION

The invention is a method of removing inter-numerology interference at base stations, which occurs between numerologies to be used in 5G and beyond. The said method can be used in different ways, this method can be performed in a module and a device hardware or it can be used by uploading or downloading a hardware. In one embodiment of the invention, the said method is embedded in the pre-equalizer (5) and the pre-equalizer (5) is adapted to run the method that removes the inter-numerology interference.

Orthogonal frequency division multiplexing (OFDM) is a multiplexing method used in 4G and LTE communication systems. Here, more than one subcarrier is orthogonal to each other and does not interfere with each other. The number of subcarriers used in 4G and LTE has been determined as 128, 256, 512, 1024 and 2048, and the bandwidth covered by these subcarriers in the corresponding frequency is 1.25 Mhz, 2.5 Mhz, 5 MHz, 10 Mhz and 20 Mhz. In these systems, the width between subcarriers is 15 kHz. The communication symbols to be sent are first placed in the frequency dimension, then these signals are transferred to the time dimension by taking the inverse discrete Fourier transform with the length of the subcarrier number, and finally, a certain length of the end of these signals is added to the beginning of the signal, this process is called cyclic prefix (Cyclic Prefix) addition. In this way, OFDM signals are made resistant to multipath channel fading.

In GSM technology, in 5G and beyond, it is aimed to use 30, 60, 120 and 240 kHz of subcarriers as well as the use of 15 kHz length of subcarrier. Here, it is aimed to use 15, 30 and 60 kHz subcarriers for GSM communications, and 60, 120 and 240 kHz subcarriers for millimetric wave communications. These OFDM signals with different subcarrier spacing are called Numerologies. For example; numerology (NSC numerology) with narrow carrier range or Numerology 0 (numerology zero) represents 4G and LTE signals of 15 kHz, while numerology (WSC numerology) with wide carrier range or Numerology 1 (numerology one) represents OFDM signals of 30 kHz.

The invention is; A method of removing inter-numerology interference (INI) to enable numerology (numerology-NSC) with a narrow subcarrier spacing in the common frequency band and numerology-WSC with a wide subcarrier spacing to be brought together in the common frequency band without placing any protective band between them, and a pre-equalizer (5) for performing this method, characterized in that the said method comprises the following steps;

Determining the numerologies to be placed in the common frequency band,

Obtaining an integer Q by dividing the wide subcarrier spacing by the narrow subcarrier spacing, Determining how many numerology-WSC OFDM symbols should be used together with the obtained integer Q, one numerology-NSC OFDM symbol, Placing numerology-NSC and numerology-WSC subcarriers side by side without using any protective band between them in frequency dimension separately, and then obtaining time signals by taking inverse discrete Fourier transforms separately, For Numerology-NSC, after placing its subcarriers, taking N-point inverse discrete Fourier transform, and generating the N-length time signal, For Numerology-WSC, after placing its subcarriers, taking (N/Q)-point inverse discrete Fourier transform, and generating the (N/Q)-length time signal, Adding a cyclic prefix of $N_{cp}$ length to the beginning of the time signal of Numerology NSC and obtaining a Numerology-NSC OFDM signal of $(N+N_{cp})$ length, Adding a cyclic prefix of $(N_{cp}/Q)$ length to the beginning of the time signal of Numerology-WSC and obtaining a Numerology-WSC OFDM signal of $(N/Q+N_{cp}/Q)$ length, Adding Q Numerology-WSC signals of $(N/Q+N_{cp}/Q)$ length end to end and adding with numerology-NSC signal of $(N+N_{cp})$ length in time dimension and placing numerology-NSC and numerology-WSC side by side in the common frequency band, which is generated to be side by side in frequency dimension separately, Since Numerology-WSC is shorter in time dimension than numerology-NSC, Q numerology-WSC signals are added end to end, ensuring that it has the same length in time dimension as numerology-NSC, and obtaining a multi-numerology signals of $N+N_{cp}$ length in time, which are placed side by side in the common frequency band, Determining P subcarriers adjacent to the numerology-WSC of the numerology-NSC placed in the common frequency band for INI removal process, Determining K subcarriers adjacent to the numerology-NSC of the numerology-WSC placed in the common frequency band for INI removal process, Determining P and K subcarriers taken from both numerologies for the pre-equalization process, Linear modeling of how the adjacent P subcarriers of numerology-NSC interfere with the adjacent K subcarriers of numerology-WSC with discrete Fourier and inverse discrete Fourier transform matrices (the equation is explained in detail in the next steps), $$INI_{q,wsc} = W_{q,wsc}^{INI} * X_{nsc}$$

Linear modeling of how the adjacent K subcarriers of Q signals of numerology-WSC interfere with the adjacent P subcarriers of numerology-NSC with discrete Fourier and inverse discrete Fourier transform matrices (the equation is explained in detail in the next steps), $$INI_{nsc} = \sum_{q=0}^{Q-1} W_{q,nsc}^{INI} * X_{q,wsc}$$

Modeling of how adjacent P and K subcarriers of the numerologies interfere with each other with $W^{INI}$ matrix, $$\underbrace{\begin{bmatrix} X_{nsc}^{INI} \\ X_{0,wsc}^{INI} \\ \vdots \\ X_{Q-1,wsc}^{INI} \end{bmatrix}}_{X^{INI}} = \underbrace{\begin{bmatrix} I_P & W_{q,nsc}^{INI} & \cdots & W_{Q-1,nsc}^{INI} \\ W_{0,wsc}^{INI} & I_K & \cdots & 0_K \\ \vdots & \vdots & \ddots & \vdots \\ W_{Q-1,wsc}^{INI} & 0_K & \cdots & I_K \end{bmatrix}}_{W^{INI}} \underbrace{\begin{bmatrix} X_{nsc} \\ X_{0,wsc} \\ \vdots \\ X_{Q-1,wsc} \end{bmatrix}}_{X}$$

Obtaining an INI pre-equalization matrix of $(P+Q*K)\times(P+Q*K)$ size by using the inverse of the square matrix $W^{INI}$, By placing the subcarriers of numerology-NSC and numerology-WSC one under the other, a column vector of $(P+Q*K)\times1$ size is generated, this vector is called the X column vector. Multiplying these subcarriers by a pre-equalization matrix $(W^{INI})^{-1}$ before the multi-numerology signals are generated, Placing the new symbols in numerologies after multiplying the symbols to be used in numerology with the pre-equalization matrix, Generating multi-numerology signal with INI removed after placing new symbols in numerologies, With the inter-numerology interference removal method of the application, numerologies with wide subcarrier spacings and narrow subcarrier spacings can be placed in the common frequency band without a protective band between them. In the method of the application, firstly, the numerologies to be placed side by side in the common frequency band are determined. OFDM signals with 15 kHz, 30 kHz, 60 kHz, 120 kHz and 240 kHz of subcarrier spacings are called numerologies. Numerology with a narrow subcarrier spacing is accepted as numerology-NSC (numerology narrow subcarrier spacing), and numerology with a wide subcarrier spacing is considered as numerology-WSC (numerology wide subcarrier spacing).

The said method is used to remove inter-numerology interference. The said method is preferably performed by a pre-equalizer (5). The pre-equalizer (5) can be a device, a module, a chip, an external module, an electronic card, and an external card that can be added to the electronic cards, which are adapted to operate the said method. In this embodiment, the invention is a pre-equalizer (5) to remove the numerologies, wherein said pre-equalizer (5) is adapted to perform the above method to remove inter-numerology interference. The pre-equalizer (5) can preferably be applied to the signal generating or generating sections in the base stations and transmitters.

The inter-numerology interference removal method of the invention is a method that works in transmitters at base stations. The said method is preferably performed by a pre-equalizer (5). The said method and pre-equalizer (5) may be a module, modules, a computer, a transmitter, a receiver, a processor in each computer, or it may be software modules generated to perform related operations on a processor in a single computer. In the said computer or computers, a transmitter may be located in a server system, or may be a personal computer (laptop, desktop computer, tablet, etc.) separate from the transmitter and the server.

An integer Q is obtained by dividing the frequency range with a wide subcarrier spacing by the frequency range with a narrow subcarrier spacing from two different numerologies to be placed side by side in the frequency dimension. For example, if 2 different numerologies with 15 kHz subcarrier spacing and 30 kHz subcarrier spacing are selected, the number Q is (two) 2, which is the result of 30/15 (thirty divided by fifteen). For this example, 1 numerology with 15 kHz subcarrier and 2 numerology with 30 kHz subcarrier can generate a multi-numerology OFDM signal.

One numerology-NSC OFDM signal and Q numerology-WSC OFDM signals generate one multi-numerology OFDM signal. In other words, 1 unit is taken from numerology with a narrow subcarrier spacing (numerology NSC), and Q units are taken from numerology with a wide subcarrier spacing (numerology WSC).

N is found by dividing the frequency band by the narrow subcarrier spacing. Thus, N units of numerology-NSC can be placed and (N/Q) units of numerology-WSC can be placed in the common frequency band. For numerology NSC, the common frequency band is divided into N subcarriers, while for numerology WSC, the same frequency band is divided into (N/Q) subcarriers. For example, in a frequency band of 960000 Hz, the N number is 64 and the N/Q number is 32 for 15 kHz and 30 kHz numerologies.

The subcarriers of numerology-NSC are placed in the desired region of these N subcarrier of common frequency bands. Subcarriers of numerology-WSC are placed in the remaining frequency band to be adjacent to numerology-NSC.

Numerology-NSC and Numerology-WSC subcarriers are placed side by side without using any protective bands between them in separate frequency dimensions. Then, time signals are obtained by taking inverse discrete Fourier transforms separately.

For Numerology-NSC, after placing its subcarriers, N-point inverse discrete Fourier transform is taken, and the N-length time signal is generated.

For Numerology-WSC, after placing its subcarriers, (N/Q)-point inverse discrete Fourier transform is taken, and the (N/Q)-length time signal is generated.

The cyclic prefix with Nep length is added to beginning of the time signal of the numerology-NSC. In this way, $(N+N_{cp})$ length Numerology-NSC signal is obtained.

The cyclic prefix with $(N_{cp}/Q)$ length is added to beginning of the time signal of the numerology-WSC. In this way, $(N/Q+N_{cp}/Q)$ length Numerology-WSC signal is obtained.

Then; to generate a multi-numerology signal of $N+N_{cp}$ length, Q Numerology-WSC signals of $(N/Q+N_{cp}/Q)$ length are added end to end and collected with numerology-NSC signal of $(N+N_{cp})$ length in time dimension. In this way, numerology-NSC and numerology-WSC, which are generated side by side in separate frequency dimensions, are placed side by side in the common frequency band. Since numerology-WSC is shorter in time than numerology-NSC, Q numerology-WSC signals are added end to end and have the same length as numerology-NSC in time. After these processes, multi-numerology signal of $N+N_{cp}$ length is obtained in time, which are placed side by side in the common frequency band.

When multi-numerology OFDM signals are generated by collecting numerology-NSC and numerology-WSC in time dimension, adjacent subcarriers of numerology-NSC and numerology-WSC are subjected to inter-numerology interference. This inter-numerology interference is caused by the out-of-band emissions of OFDM signals. OFDM signals emit interference outside their bands in the frequency dimension. In traditional methods, the protective bands are placed between different OFDM signals to reduce the effect of these out-of-band emissions on the adjacent bands.

As the subcarriers of Numerology-NSC and numerology-WSC become distant from each other in frequency dimension, the inter-numerology interference they are exposed to decreases.

The numerology-NSC signal interferes with the non-cyclic prefix parts of the numerology-WSC's Q signals in the time dimension. In other words, it interferes with the subcarriers of numerology-WSC in the frequency dimension.

The Q signals of the numerology-WSC interferes with the non-cyclic prefix part of the numerology-NSC in the time dimension. In other words, it interferes with the subcarriers of numerology-NSC in the frequency dimension.

It is linear modeled how the adjacent P subcarriers of numerology-NSC interfere with the adjacent K subcarriers of numerology-WSC with discrete Fourier and inverse discrete Fourier transform. The following matrix is used for the said model.

$$INI_{q,wsc} = W_{q,wsc}^{INI} * X_{nsc}$$

Here $X_{nsc}$ is a column vector of P×1 containing the symbols on the P subcarriers of numerology-NSC adjacent to Numerology-WSC. $INI_{q,wsc}$ is a column vector of K×1 defining the interference on the adjacent K subcarriers of the q OFDM symbol of numerology-WSC. Here, the number q is in the range from 0 to Q−1. If $$W_{q,wsc}^{INI}$$

is the matrix of K×P, it is the matrix that linearly models how the interference occurs. The matrix $$W_{q,wsc}^{INI}$$

can be obtained by multiplying the corresponding parts of the N and (N/Q) point discrete and inverse discrete Fourier transform matrices. These related part are defined as regions of the adjacent P subcarriers of Numerology-NSC acting on the neighboring K subcarriers of Numerology-WSC.

In the next step, it is linearly modeled how the adjacent K subcarriers of Q signals of numerology-WSC interfere with the adjacent P subcarriers of numerology-NSC with discrete Fourier and inverse discrete Fourier transform matrices. The following matrix is used for the said modeling.

$$INI_{nsc} = \sum_{q=0}^{Q-1} W_{q,nsc}^{INI} * X_{q,wsc}$$

Here $X_{q,wsc}$ is a column vector of K×1 containing the symbols on the P subcarriers of numerology-WSC adjacent to numerology-NSC in the Q OFDM signals. $INI_{nsc}$ is a column vector of P×1 defining the interference on the adjacent P subcarriers of numerology-NSC. If $$W_{q,nsc}^{INI}$$

is the matrix of P×K, it is the matrix that linearly models how the interference occurs. The matrix $$W_{q,nsc}^{INI}$$

can be obtained by multiplying the corresponding parts of the N and (N/Q) point discrete and inverse discrete Fourier transform matrices. These related part are defined as regions of the adjacent K subcarriers of Numerology-WSC acting on the neighboring P subcarriers of Numerology-NSC.

The said matrices $$W_{q,wsc}^{INI} \text{ and } W_{q,nsc}^{INI}$$

are generated by discrete Fourier transform and inverse discrete Fourier transform matrices. As an example, we can explain the generation of the matrix $$W_{q,wsc}^{INI}$$

for value q=1 as follows. It models how P subcarriers adjacent to the first OFDM signal of Numerology-WSC of Numerology NSC interferes with the adjacent K subcarriers the first OFDM signal of numerology-WSC. Consider the discrete Fourier transform matrix for numerology-NSC is a matrix A of N×N size, and the inverse discrete Fourier transform matrix with cyclic prefix is a matrix B of $(N+N_{cp})\times(N+N_{cp})$ size. Similarly, consider the discrete Fourier transform matrix for numerology-WSC is a matrix C of M×M size, and the inverse discrete Fourier transform matrix with cyclic prefix is a matrix D of $(M+N_{cp}/Q)\times((M+N_{cp}/Q)$ size. The portion of adjacent P subcarriers of Numerology-NSC corresponding to the first OFDM symbol of Numerology-WSC in the time dimension is generated by multiplying the P subcarrier column vector and a certain portion of matrix B (consider a certain portion of matrix B is matrix B1). The result of this multiplication is multiplied again by a certain portion of the matrix C (consider a certain portion of the matrix C is the matrix C1) and the inter-numerology interference on the adjacent K subcarriers of the first OFDM signal of Numerology-WSC is obtained. In brief, matrix $$W_{q,wsc}^{INI}$$

is a matrix of K×P, which is generated using a certain portion of matrix B and a certain portion of matrix C. All other $$W_{q,wsc}^{INI}$$

and $$W_{q,nsc}^{INI}$$

matrices are calculated with the same method.

It models how adjacent P and K subcarriers of the numerologies interfere with each other with $W^{INI}$ matrix, This matrix is as follows and is defined as follows.

$$\underbrace{\begin{bmatrix} X_{nsc}^{INI} \\ X_{0,wsc}^{INI} \\ \vdots \\ X_{Q-1,wsc}^{INI} \end{bmatrix}}_{X^{INI}} = \underbrace{\begin{bmatrix} I_P & W_{q,nsc}^{INI} & \cdots & W_{Q-1,nsc}^{INI} \\ W_{0,wsc}^{INI} & I_K & \cdots & 0_K \\ \vdots & \vdots & \ddots & \vdots \\ W_{Q-1,wsc}^{INI} & 0_K & \cdots & I_K \end{bmatrix}}_{W^{INI}} \underbrace{\begin{bmatrix} X_{nsc} \\ X_{0,wsc} \\ \vdots \\ X_{Q-1,wsc} \end{bmatrix}}_{X}$$

Here, interferences to numerology-NSC and Numerology-WSC are written in a single matrix. Here $$X_{nsc}^{INI}$$

defines the column vector P×1 and the INI-exposed subcarriers of the numerology-NSC after the multi-numerology signal has been generated. If $$X_{q,wsc}^{INI}$$

is column vectors of K×1, it defines the INI-exposed subcarriers of the Q OFDM signals of numerology-WSC after the multi-numerology has been generated. $W^{INI}$ defines the square matrix which generates interference in (P+Q*K)×(P+Q*K) dimension. X represents the subcarrier column vector independent from the interference of (P+Q*K)×1. The first P element of X defines the adjacent P subcarrier of numerology-NSC, and the last Q*K element defines the adjacent K subcarriers in the Q subsignals of numerology-WSC. $X^{INI}$ represents the subcarrier column vector exposed to inter-numerology interference of (P+Q*K)×1. The first P element of $X^{INI}$ defines the P subcarrier of numerology-NSC exposed to interference, and the last Q*K element defines the K subcarriers exposed to interference in the Q subsignals of numerology-WSC. $I_P$ defines unit matrix of P×P, $I_K$ defines unit matrix of K×K and $0_K$ defines zero matrix of K×K.

In the multi-numerology OFDM symbol, the interference in the adjacent P subcarriers of the Numerologies is modeled by $W^{INI}$ matrix. In other words, the interference on the adjacent subcarriers of numerologies that occurs in the generation of multi-numerology is modeled as the product of a $W^{INI}$ matrix of subcarriers of numerologies. In this way, it is mathematically modeled how an inter-numerology interference has been made. In other words, a vector is generated by writing all the adjacent symbols of numerology-NSC and numerology-WSC one under the other, and how these subcarriers are exposed to inter-numerology interference is modeled by $W^{INI}$ matrix multiplication.

With the $W^{INI}$ matrix, it is mathematically modeled how the adjacent P subcarriers of two different numerologies are affected by the inter-numerology interference. In this way, the multi-numerology generation system acts as if it was multiplying the subcarriers of the used numerologies with a $W^{INI}$ matrix.

Since the inter-numerology interference is modeled with $W^{INI}$ matrix, it is possible to remove inter-numerology interference by using the inverse of this matrix, thanks to a pre-equalization matrix.

A pre-equalization matrix is generated by using the inverse of $W^{INI}$ matrix. This pre-equalizer matrix is used to reconstruct transmission symbols by multiplying the subcarriers of numerology.

A row vector is generated by placing the subcarriers of numerology-NSC and numerology-WSC one under the other. These subcarriers are multiplied by a pre-equalization matrix $(W^{INI})^{-1}$ before the multi-numerology signals are generated.

The result is placed on subcarriers and when these new subcarriers are used to generate multi-numerology signals, the interference on the subcarriers is removed at the transmitters before transmission, as it acts as if it was multiplied by $W^{INI}$ matrix by the system.

$$X^b = \left(W^{INI}\right)^{-1} X$$

$$X = \left(W^{INI}\right)\left(W^{INI}\right)^{-1} X$$

Here $X^b$ defines the symbols in subcarriers that will be allocated to numerologies separately. Since these new subcarriers will be multiplied by $W^{INI}$ again in multi-numerology generation, X, in other words, inter-numerology interference removed multi numerology subsignal is generated.

The inter-numerology interference removal method of the invention is a method that works in transmitters at base stations. The said method may be a module, modules, a computer, a transmitter, a receiver, a processor in each computer, or it may be software modules generated to perform related operations on a processor in a single computer. In the said computer or computers, a transmitter may be located in a server system, or may be a personal computer (laptop, desktop computer, tablet, etc.) separate from the transmitter and the server.

The invention claimed is:

1. A pre-equalization method for removing inter-numerology interference in order to enable numerology (numerology-NSC) with a narrow subcarrier spacing in a common frequency band and numerology (numerology-WSC) with a wide subcarrier spacing brought side-by-side in the common frequency band without placing a protective band between the narrow subcarrier spacing and the wide subcarrier spacing, wherein the pre-equalization method comprises:

determining numerologies to be placed in the common frequency band;

obtaining an integer Q by dividing the wide subcarrier spacing by the narrow subcarrier spacing;

determining a number of numerology-WSC symbols to be used together with the obtained integer Q;

placing numerology-NSC and numerology-WSC subcarriers side-by-side without a the protective band between the numerology-NSC and numerology-WSC subcarriers in a frequency dimension separately so as to obtain time signals by taking inverse discrete Fourier transforms separately;

taking N-point inverse discrete Fourier transforms and generating an N-length time signal for numerology-NSC after placing the numerology-NSC subcarriers, wherein N is an integer;

taking (N/Q)-point inverse discrete Fourier transforms and generating an (N/Q)-length time signal for numerology-WSC after placing the numerology-WSC subcarriers;

adding a cyclic prefix of $N_{CP}$ length to a beginning of the N-length time signal of the numerology-NSC so as to obtain a numerology-NSC signal of $(N+N_{CP})$ length;

adding a cyclic prefix of $(N_{CP}/Q)$ length to a beginning of the (N/Q)-length time signal of for numerology-WSC so as to obtain a numerology-WSC signal of $(N/Q+N_{CP}/Q)$ length;

adding Q numerology-WSC signals of the $(N/Q+N_{CP}/Q)$ length end-to-end and adding with the numerology-NSC signal of $(N+N_{CP})$ length in time dimension and placing numerology-NSC and numerology-WSC side-by-side in the common frequency band which is generated to be side-by-side separately in a frequency dimension, wherein since numerology-WSC is shorter in time dimension than numerology-NSC then Q numerology-WSC signals are added end-to-end so as to assure that the numerology-WSC has a same length in the time dimension as the numerology-NSC so as to obtain a multi-numerology signal of $N+N_{CP}$ length in time placed side-by-side in the common frequency band;

determining P-subcarriers adjacent to the numerology-WSC of the numerology-NSC placed in the common frequency band for removal of interference, wherein P is an integer;

determining K-subcarriers adjacent to the numerology-NSC of the numerology-WSC placed in the common frequency band for removal of interference, wherein K is an integer;

determining the P-subcarriers and the K-subcarriers taken from the numerology-NSC and the numerology-WSC for pre-equalization;

linear modeling of interference of said P-subcarriers of numerology-NSC with adjacent K-subcarriers of numerology-WSC with discrete Fourier and inverse discrete Fourier transform matrices;

linear modeling of interference of adjacent K-subcarriers of Q signal of numerology-WSC with said P-subcarriers of numerology-NSC with discrete Fourier and inverse discrete Fourier transformation matrices;

modeling of an interference of adjacent P-subcarriers and K-subcarriers with each other with $W^{INI}$ matrix;

obtaining an INI (Inter-Numerology Interference between the numerology-NSC and numerology-WSC signals) pre-equalization matrix of $(P+Q*K)\times(P+Q*K)$ size by using an inverse of the $W^{INI}$ matrix;

generating a column vector of $(P+Q*K)\times1$ size by placing the subcarriers of numerology-NSC and numerology-WSC one under the other, the column vector being an X column vector;

multiplying the subcarriers by a pre-equalization matrix $(W^{INI})^{-1}$ before the multi-numerology signals are generated;

placing new symbols in the numerologies after multiplying the symbols to be used in numerology with the pre-equalization matrix, the new symbols being the numerology-NSC subcarrier symbols (P symbols) and the numerology-WSC subcarrier symbols corresponding to Q symbols on each of the K subcarriers (QK symbols) placed in the column vector, wherein Q denotes a numerology ratio representing the number of numerology-WSC symbols within one numerology-NSC symbol duration; and generating a multi-numerology signal with INI removed after placing the new symbols in the numerologies.

2. The pre-equalization method of claim 1, wherein the number Q as two is obtained by dividing a frequency range with the wide subcarrier spacing by the frequency range with the narrow subcarrier spacing for two different numerologies with 15 kHz subcarrier spacing and 30 kHz subcarrier spacing.

3. The pre-equalization method of claim 1, wherein one multi-numerology signal is generated with one numerology-NSC and Q numerology-WSC signals and wherein numerology-NSC and numerology-WSC subcarriers are placed in the common frequency band.

4. The pre-equalization method of claim 1, wherein the common frequency band is divided into N-subcarriers for numerology-NSC and the same frequency band is divided into (N/Q) subcarriers for numerology-WSC and subcarriers of numerology-NSC are placed in a desired region of the common frequency band of the N-subcarriers and the sub-carriers of numerology-WSC are placed in a remaining frequency band so as to be adjacent to numerology-NSC.

5. The pre-equalization method of claim 1, wherein a $$INI_{q,wsc} = W_{q,wsc}^{INI} * X_{nsc}$$

matrix is linearly modeled to indicate how the adjacent P subcarriers of numerology-NSC interfere with the adja-cent K-subcarriers of numerology-WSC with discrete Fourier and inverse discrete Fourier transform matri-ces, wherein:

$INI_{q,WSC}$ denotes inter-numerology interference affect-ing a q-th numerology-WSC OFDM symbol q rep-resenting an index of the numerology-WSC symbol within a duration of one numerology-NSC symbol;

$$W_{WSC}^{INIq},$$

denotes an inter-numerology interference matrix that models an interference relationship between adjacent numerology-NSC subcarriers and adjacent numerol-ogy-WSC subcarriers, the matrix being derived using discrete Fourier transform (DFT) and inverse discrete Fourier transform (IDFT) matrices; and
$X_{nsc}$ denotes a vector of numerology-NSC subcarrier symbols corresponding to an n-th numerology-NSC OFDM symbol.

6. The pre-equalization method of claim 1, wherein a $$INI_{nsc} = \sum_{q=0}^{Q-1} W_{q,nsc}^{INI} * X_{q,wsc}$$

matrix is linearly modeled as to how the adjacent K-sub-carriers of Q signals of numerology-WSC interfere with adjacent P-subcarriers of numerology-NSC with discrete Fourier and inverse discrete Fourier transform matrices, wherein:

$INI_{nsc}$ denotes inter-numerology interference affecting the numerology-NSC signal;

the summation from q=0 to Q−1 represents interference contributions of a Q numerology-WSC OFDM sym-bols occurring within a duration of one numerology-NSC symbol;

g denotes an index of the numerology-WSC symbol, and O denotes a numerology ratio representing the number of numerology-WSC symbols within one numerology-NSC symbol duration;

$$W^{INI}_{q, nsc}$$

denotes an inter-numerology interference matrix describing how adjacent K numerology-WSC sub-carriers interfere with adjacent P numerology-NSC subcarriers, the matrix being derived using discrete Fourier transform (DFT) and inverse discrete Fourier transform (IDFT) matrices; and $X_{q,WSC}$ denotes a vector of numerology-WSC subcar-rier symbols corresponding to an q-th numerology-WSC OFDM symbol.

7. The pre-equalization method of claim 1, modeled with the following matrix $$\underbrace{\begin{bmatrix} X_{nsc}^{INI} \\ X_{0,wsc}^{INI} \\ \vdots \\ X_{Q-1,wsc}^{INI} \end{bmatrix}}_{X^{INI}} = \underbrace{\begin{bmatrix} I_P & W_{q,nsc}^{INI} & \cdots & W_{Q-1,nsc}^{INI} \\ W_{0,wsc}^{INI} & I_K & \cdots & 0_K \\ \vdots & \vdots & \ddots & \vdots \\ W_{Q-1,wsc}^{INI} & 0_K & \cdots & I_K \end{bmatrix}}_{W^{INI}} \underbrace{\begin{bmatrix} X_{nsc} \\ X_{0,wsc} \\ \vdots \\ X_{Q-1,wsc} \end{bmatrix}}_{X}$$

to show how adjacent P-subcarriers and K-subcarriers interfere with each other, wherein:

in the left-hand vector, $X_{INI}$ represents interference components affecting the numerology-NSC and numerology-WSC signals;

the vector X represents transmitted subcarrier symbol vectors consisting of the numerology-NSC subcar-rier symbols $X_{NSC}$ and the numerology-WSC sub-carrier symbol vectors $X_{q,WSC}$ for q=0, . . . , Q−1;

$W^{INI}$ denotes inter-numerology interference matrix describing how adjacent P numerology-NSC subcar-riers and adjacent K numerology-WSC subcarriers interfere with each other; the matrix is constructed using discrete Fourier transform (DFT) and inverse discrete Fourier transform (IDFT) matrices;

$I_P$ and $I_K$ denote identity matrices of sizes P×P and K×K respectively, and Ox denotes a zero matrix of size K×K; and P denotes a number of adjacent numerology-NSC sub-carriers and K denotes a number of adjacent numer-ology-WSC subcarriers, while Q denotes a numer-ology ratio representing a number of numerology-WSC symbols within a duration of one numerology-NSC symbol.

8. The pre-equalization method of claim 1, wherein inter-ference on adjacent P numerology-NSC subcarriers and K numerology-WSC subcarriers that occur in the generating of multi-numerology as a product of $W^{INI}$ matrix of subcarriers of numerologies is modeled.

9. The pre-equalization method of claim 1, wherein a vector is generated by writing all subcarrier symbols asso-ciated with adjacent numerology-NSC and numerology-WSC subcarriers located in a shared frequency region, so as to form a combined vector by stacking the symbol vectors of numerology-NSC and numerology-WSC, wherein the com-bined vector is used to model inter-numerology interference with $W^{INI}$ matrix.

10. The pre-equalization method of claim 1, wherein inter-numerology interference is removed by using the inverse of the $W^{INI}$ matrix.

11. The pre-equalization method of claim 1, wherein a pre-equalization matrix is generated by using an inverse of the $W^{INI}$ matrix, the pre-equalization matrix reconstructing transmission symbols by multiplying the numerology-NSC subcarriers and numerology-WSC subcarriers.

12. The pre-equalization method of claim 1, wherein a row vector is generated by stacking numerology-NSC and numerology-WSC subcarriers and multiplying by a pre-equalization matrix of $(W^{INT})^{-1}$ before the multi-numerology signal are generated and to place a result in adjacent numerology-NSC and numerology-WSC subcarriers, and removing interference on the adjacent numerology-NSC and numerology-WSC subcarriers at transmitters before transmission where new subcarriers are used to generate multi-numerology signals.

\* \* \* \* \*